(12) United States Patent
Pritchard et al.

(10) Patent No.: US 8,490,769 B2
(45) Date of Patent: Jul. 23, 2013

(54) LEVER APPLIED SOLENOID CLUTCH ACTUATOR

(75) Inventors: Larry A. Pritchard, Macomb, MI (US); Christopher V. Kurmaniak, Clarkston, MI (US)

(73) Assignee: BorgWarner Inc., Auburn Hills, MI (US)

( * ) Notice: Subject to any disclaimer, the term of this patent is extended or adjusted under 35 U.S.C. 154(b) by 589 days.

(21) Appl. No.: 12/726,402

(22) Filed: Mar. 18, 2010

(65) Prior Publication Data
US 2010/0236888 A1 Sep. 23, 2010

Related U.S. Application Data

(60) Provisional application No. 61/161,427, filed on Mar. 19, 2009.

(51) Int. Cl.
*F16D 27/115* (2006.01)
*F16D 27/14* (2006.01)

(52) U.S. Cl.
USPC ............ 192/84.7; 192/70.24; 192/84.91; 192/84.93; 192/84.96; 192/109 R

(58) Field of Classification Search
USPC .................. 192/84.7, 70.24, 84.5, 84.51
See application file for complete search history.

(56) References Cited

U.S. PATENT DOCUMENTS

| | | | | |
|---|---|---|---|---|
| 2,880,835 A | * | 4/1959 | Hass | 192/99 A |
| 2,893,528 A | * | 7/1959 | Anton | 192/84.91 |
| 4,175,650 A | * | 11/1979 | Miller | 192/84.91 |
| 5,911,291 A | | 6/1999 | Suetake et al. | |
| 6,378,677 B1 | | 4/2002 | Kuroda et al. | |
| 6,537,172 B1 | | 3/2003 | McAuliffe, Jr. et al. | |
| 6,905,008 B2 | | 6/2005 | Kowalsky et al. | |

FOREIGN PATENT DOCUMENTS

DE 3608118 A1 * 9/1987
WO WO 99/42738 8/1999

* cited by examiner

*Primary Examiner* — Rodney Bonck
(74) *Attorney, Agent, or Firm* — BrooksGroup

(57) ABSTRACT

A electromagnetic clutch assembly for use in a vehicle is presented. More specifically, the clutch assembly comprises an input member; an output member; a friction clutch pack having a first plurality of clutch plates coupled for rotation with said input member and a second plurality of clutch plates interleaved with said first plurality of clutch plates and coupled for rotation with said output member; a solenoid coil; an actuator hub having an armature plate; and a cam lever assembly having a first end engaging said actuator hub and a second end engaging said friction clutch pack. When electrical current is applied to the solenoid coil, the armature plate moves the actuator hub, the actuator hub engages the cam lever and causes said cam lever to compress the interleaved first and second plurality of clutch plates, thereby, resulting in the coupling of the input and output members.

24 Claims, 5 Drawing Sheets

LEVER APPLIED SOLENOID CLUTCH ACTUATOR

This application claims the benefit of U.S. Provisional Application Ser. No. 61/161,427 filed on Mar. 19, 2009, entitled "LEVER APPLIED SOLENOID CLUTCH ACTUATOR," the entire contents of which are incorporated herein by reference.

FIELD

This invention relates generally to electromagnetic clutch assemblies and more specifically to an electromagnetic clutch having a solenoid activated cam lever actuation arrangement.

BACKGROUND

In many vehicle powertrain applications it is desirable to engage a clutch pack as a result of inputting an electrical signal to an electromagnetic coil. The clutch pack may control torque between an input and an output. One design of a conventional electromagnetic clutch assembly consists of a friction clutch pack having a plurality of interleaved friction plates, a solenoid coil, an armature plate, and a ball ramp mechanism. In this type of electromagnetic clutch assembly, electrical current is applied to the solenoid coil, which generates a magnetic force that attracts the armature plate to the coil housing and causes the coil housing, armature plate, and one element of the ball ramp mechanism to rotate relative to a second element. Since the second element of the ball ramp mechanism is linked to the output side of the clutch pack, the ball ramp mechanism imparts a clamping force against the clutch pack, thereby, engaging the interleaved friction plates.

Several of the engineering parameters considered when designing an electromagnetic clutch include power consumption, the time necessary to engage/disengage the clutch, the magnitude of the torque transferred, and the ability to modulate torque transfer. It is desirable in the automotive industry to continually improve upon the design of an electromagnetic clutch assembly in order to lower manufacturing costs by either increasing the ease associated with manufacturing each component or by having fewer components to assemble. Accordingly, there exists a need in the industry to continually provide electromagnetic clutch assemblies that are economical to manufacture and to assemble.

SUMMARY

The present invention provides a clutch assembly for use in a vehicle powertrain application. One embodiment of a clutch assembly, constructed in accordance with the teachings of the present invention, generally comprises an input member; an output member; a friction clutch pack having a first plurality of clutch plates coupled for rotation with the input member and a second plurality of clutch plates interleaved with said first clutch plates and coupled for rotation with the output member; a solenoid coil; an actuator hub having an armature plate; and a cam lever assembly having a first end engaging said actuator hub and a second end engaging said friction clutch pack. When electrical current is applied to the solenoid coil, the armature plate moves the actuator hub, the actuator hub engages the cam lever and causes said cam lever to compress the interleaved first and second plurality of clutch plates, thereby, resulting in the coupling of the input and output members.

In another aspect of the present invention the clutch assembly further comprises a bell-shaped housing that engages a flux concentrating annular housing with said annular housing providing protection for the solenoid coil. The bell-shaped housing, flux concentrating annular housing, and solenoid coil are preferably stationary with the flux concentrating annular housing and solenoid coil being separated from the armature plate by an air gap. In addition, the input member may further comprise an input shaft and actively engage a flange that is coupled to either the universal joint or a secondary shaft in the vehicle.

In another aspect of the present invention, the armature plate is secured in place by a snap ring positioned in a groove integrally formed with the actuator hub. When electrical current is applied to the solenoid coil, the generated magnetic flux causes the armature plate to be attracted by and move towards the flux concentrating housing and the solenoid coil, thereby decreasing the width (w) of the air gap. The application of electrical current to the solenoid coil generates a compression energy, which is transmitted to the clutch pack as a packing force through the actuating hub and cam lever assembly. The transmitted packing force is preferably in a substantially linear relationship with the extent to which the interleaved clutch plates in the friction clutch pack are compressed.

It is another objective of the present invention to provide an electromagnetically activated clutch assembly comprising a rotatable input member; a rotatable output member; an actuator hub positioned proximate to the input member; a solenoid coil; a flux concentrating annular housing positioned proximate to the solenoid coil; an armature plate coupled to the actuator hub and separated from the flux concentrating annular housing and solenoid coil by an air gap; a cam lever assembly having a first end engaging said actuator hub and a second end engaging a friction clutch pack; and a friction clutch pack having a first plurality of clutch plates coupled for rotation with said input member and a second plurality of clutch plates interleaved with said first plurality of clutch plates and coupled for rotation with said output member.

When electrical current is applied to the solenoid coil, the magnetic flux so generated attracts the armature plate towards the flux concentrating housing and solenoid coil, thereby reducing the width (w) of the air gap and generating compression energy. Preferably, the width of the air gap decreases upon the application of electrical current to the solenoid coil by about 90%. The compression energy is transmitted as a packing force through the actuator hub and the first and second ends of the cam lever assembly to the friction clutch pack. The transfer of the packing force to the friction clutch pack causes the plates within the clutch pack to compress, thereby, coupling the input member to the output member. This packing force is preferably in a substantially linear relationship with the extent to which the clutch pack is compressed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
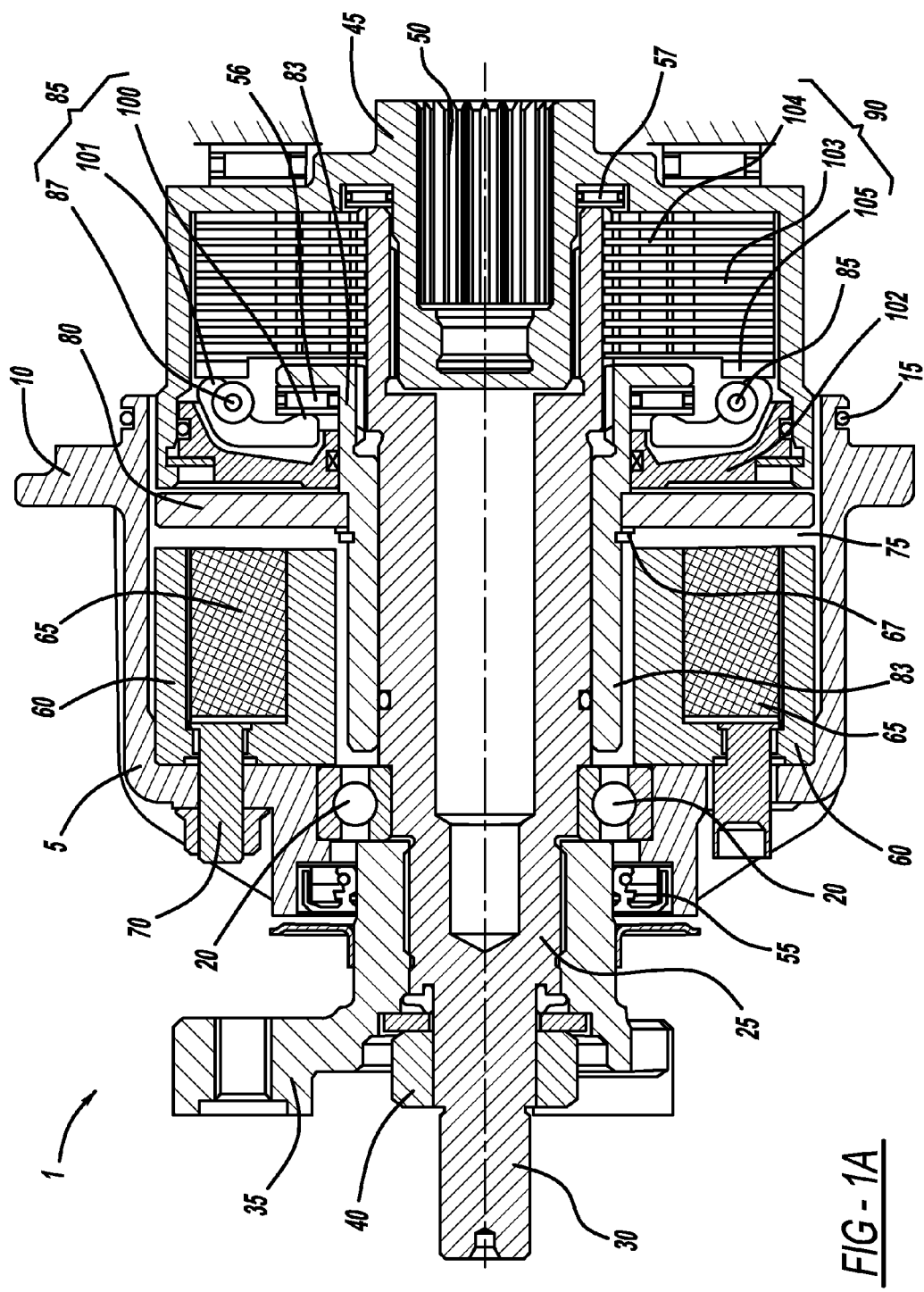
FIG. 1A is a cross-sectional view of an electromagnetic clutch assembly according to one embodiment of the present invention.

The following description is merely exemplary in nature and is in no way intended to limit the present disclosure or its application or uses. It should be understood that throughout the description and drawings, corresponding reference numerals indicate like or corresponding parts and features.

The present invention generally provides a clutch assembly for use in a vehicle. The clutch assembly generally comprises: an input member; an output member; a friction clutch pack having a first plurality of clutch plates coupled for rotation with said input member and a second plurality of clutch plates interleaved with said first plurality of clutch plates and coupled for rotation with said output member; a solenoid coil; an actuator hub having an armature plate; and a cam lever having a first end engaging said actuator hub and a second end engaging said friction clutch pack. When electrical current is applied to the solenoid coil, the armature moves the actuator hub, the actuator hub engages the cam lever and causes said cam lever to compress the interleaved first and second plurality of clutch plates, thereby, resulting in the coupling of the input and output members.

One benefit associated with the clutch assembly of the present invention is a reduction in manufacturing cost due to a decrease in the number of components that must be manufactured and assembled to form the clutch assembly. In particular, the clutch assembly of the present invention eliminates several components currently utilized in conventional electromagnetic clutch assemblies, such as a ball ramp actuator, among others. A thorough description of a conventional electromagnetic clutch assembly having a solenoid type operator is found in U.S. Pat. No. 6,905,008 issued to Kowalski et al., the entire contents of which are hereby incorporated by reference.

Referring to FIG. 1A, the electromagnetic clutch assembly 1 includes a bell-shaped, clutch assembly housing 5 that has a continuous flange or a plurality of flanges 10. These flanges may be adapted to receive fasteners used to attach the clutch assembly 1 to the housing of a secondary differential assembly (not shown) in a vehicle. An O-ring 15 or toric joint may be utilized in coordination with the flange 10 to provide an effective seal between the clutch assembly housing 5 and the secondary differential assembly. The clutch assembly housing 5 is designed to engage a ball bearing assembly 20, which in turn supports a cylindrical input member 25.

The input member 25 further comprises an input shaft 30 that defines a positive drive means. The input member 25 includes a feature, such as but not limited to male splines, keyways, and hexagonal flats, which engage a complimentary feature integrally formed with a flange 35 that is part of the universal joint or another secondary shaft (not shown). A nut 40 may be used to position and retain the flange 35 proximate to the input shaft 30.

Similarly, the input member 25 also supports the positioning of an output hub 45 and an actuating hub 83. The cylindrical wall of the output hub 45 further forms a plurality of spines or teeth 50. Oil seals 55 are typically utilized to provide fluid tight seals between the various components of the clutch assembly 1, while rolling element thrust bearings 57 are used to allow differences in speed by various rotating or moving elements. The input and output members may rotate independently of each other when the clutch assembly is not actuated.

A flux concentrating annular housing 60, which engages the bell-shaped housing 5, is used to house and provide protection for the solenoid coil 65. Electrical power is supplied to the solenoid coil through a conductor cable 70. An air gap 75 proximate to the solenoid coil 65 and annular housing 60 separates the coil and housing from an armature plate 80. The armature plate 80 engages the actuator hub 83 and is secured in place using a snap ring 67 positioned in a groove integrally formed with the actuator hub 83.

When the solenoid coil 65 is energized, the generated magnetic field causes the armature plate 80 to be attracted by and move towards the flux concentrating annular housing 60 and solenoid coil 65. This attraction and movement effectively decreases the width (w) of the air gap 75 between the annular housing/solenoid coil arrangement and the armature plate 80. Since parts are moving relative to one another, the width, w, of the air gap 75 preferably remains at a value greater than zero (i.e., a clearance gap remains). The attraction and movement of the armature plate 80 further causes the actuator hub 83 to move along the surface of the input member 25 thereby engaging and transmitting a force through thrust bearing 56 to the first end 100 of a cam lever assembly 85. This cam lever assembly 85, which pivots around a pivot point or fulcrum 87, in turn reversibly engages a primary friction clutch pack 90 through its second end 101. The force transmitted through the cam lever assembly 85 to the clutch pack 90, causes the plates within the clutch pack 90 to compress against one another. One skilled in the art will understand that more than one cam lever assembly 85 may be incorporated into the clutch assembly 1 in order to more evenly distribute the force transmitted to the clutch pack 90.

Figure 1B:
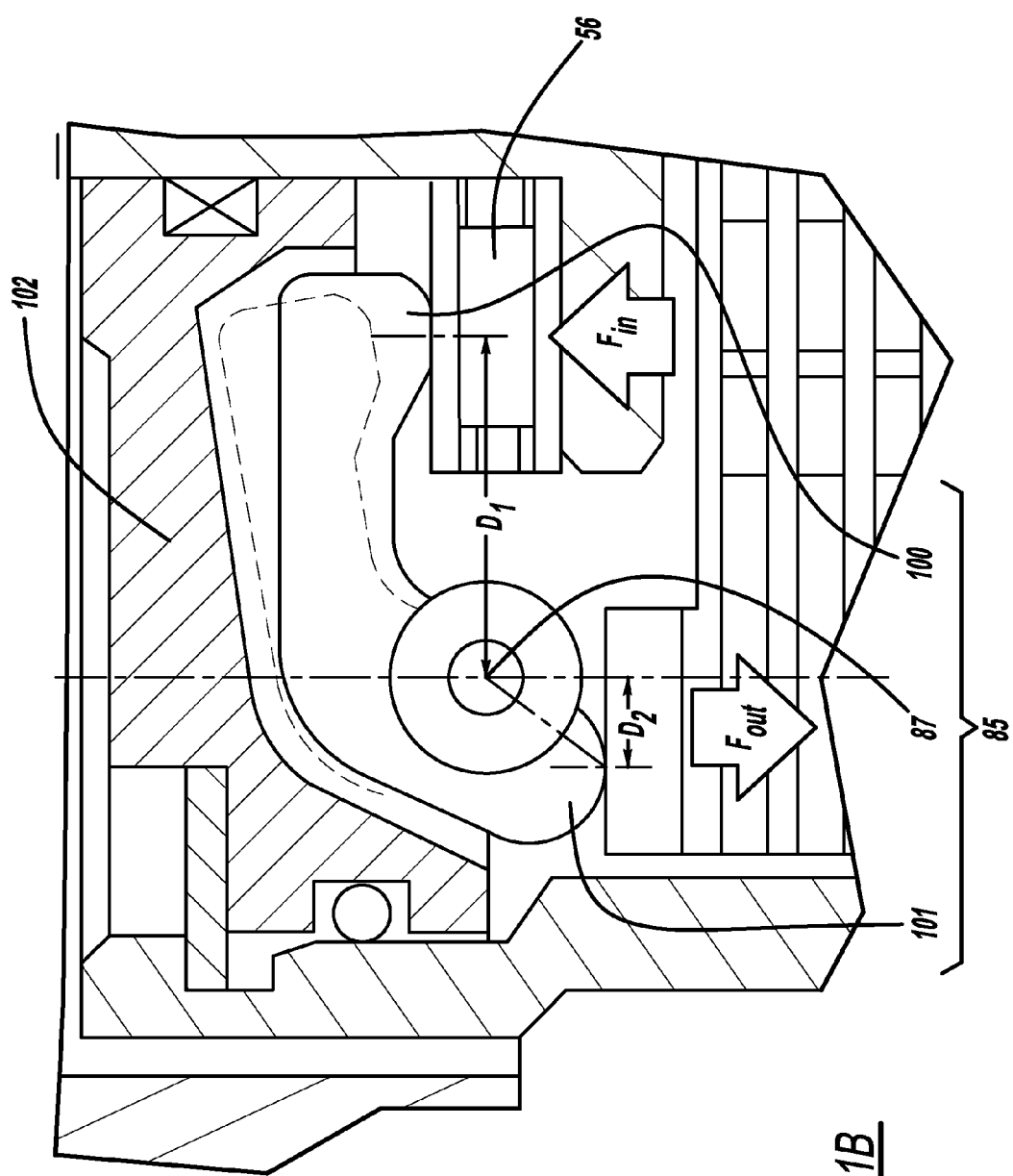
FIG. 1B is a cross-sectional view of the cam lever assembly used in the electromagnetic clutch assembly of FIG. 1A.

Referring to FIG. 1B the mechanical advantage provided by the cam lever assembly 85 is dependent upon the magnitude of the force transferred through the thrust bearing 56 to the first end 100 of the assembly 85, the distance ($D_1$) for the lever or effort arm between the first end 100 at its contact point with the thrust bearing 56 and the pivot point 87 in the assembly, and the distance ($D_2$) for the effort arm between the pivot point 87 and the second end 101 of the assembly where it contacts plate 105. Under a condition of static equilibrium, the input force ($F_{in}$) transferred to the first end 100 multiplied by the distance, $D_1$ will be equivalent to the output force ($F_{out}$) multiplied by the distance, $D_2$. In general, the cam lever assembly 85 acts a force multiplier with the output force, $F_{out}$, being greater than the input force, $F_{in}$, due to the difference in distances $D_1$ and $D_2$. Preferably $D_1$ is greater than the distance, $D_2$. One skilled in the art will understand that the distance, $D_2$ may change based on the shape of the bottom of the second end 101 that makes contact with plate 105. Another aspect of the present invention is that the direction of the output force, $F_{out}$, is opposite that of the input force, $F_{in}$.

One advantage of the present invention is that the clutch can be used in a preemptive manner. In other words, the force transmitted through the cam lever assembly 85 to the clutch pack 90 does not rely upon the relative difference in motion between the first end 100 and second end 101 of the cam lever assembly 85, but rather simply the energization of the solenoid coil 65. Thus the cam lever assembly 85 may engage the clutch pack 9 in the absence of any movement or rotation of the input member 25 or the output hub 45. In comparison, the rotation of one element relative to a second element in a conventional ball ramp mechanism is necessary for the mechanism to impart a clamping force against the clutch pack.

One skilled in the art will understand that the curved geometry of the cam lever assembly 85 between the first end 100 and second end 101 is a design feature that can impact the magnitude of the transferred force. As shown in FIG. 1B, when the lever is caused to move by the transfer of $F_{in}$ at the first end 100, the point of contact established between the second end 101 and the clutch pack 9 in order to transfer $F_{out}$ will change, thereby, modifying the output packing force, $D_2$. In addition, the cam assembly may be spring loaded and/or configured to mitigate the effect of speed or centrifugal forces. Thus when the solenoid coil 65 is not energized, the cam lever assembly 85 will not engage the clutch pack 9 by dynamic forces.

The motion of the lever may be physically restricted through the use of a mechanical stop 102. The use of such a stop 102 prevents over energization of the clutch assembly 1. One important design consideration in determining the geometry of the cam lever assembly 85 and the clearances between the various moving parts in the clutch assembly 1 is to insure that the clutch assembly 1 does not self-engage or become self-locked during engagement, but rather is capable of exhibiting a modulated output (e.g., transfer torque) in direct response to a modulated input signal (e.g., current applied to a solenoid).

The primary clutch pack 90 includes a plurality of smaller diameter plates 104 that engage the inner surface of the input member 25. These smaller clutch plates 104 may be rotated along with the input member 25. Similarly, interleaved between each pair of smaller clutch plates 104 is a larger diameter plate 103 that has an internal feature that can engage and mesh with a complimentary feature formed by the inner surface of the output hub 45. Thus the larger diameter plates 103 are freely rotatable with the output hub 45. The surface of each of the plates may include a suitable friction material. When the larger diameter and smaller diameter plates are compressed together the friction arising between the plates is enough to couple the input member 25 and the output hub 45 together. Thus allowing torque transfer through them.

The electrical characteristics exhibited by the solenoid coil 65, the current applied to the coil 65, the air gap 75 between the solenoid coil 65 and the armature 80, and the mechanical characteristics exhibited by the cam lever assembly 85 represent important design considerations that may be used to insure that the clutch assembly does not self-engage. More specifically, the electrical characteristics of the solenoid coil 65 relate to the magnitude and strength of the magnetic flux generated, while the mechanical characteristics of the cam lever assembly 85 relate to the magnitude of the force ultimately transmitted to the plates in the clutch pack 90. More specifically, the magnitude of the transmitted force is related to the overall length of the cam lever 85 and the angle established between the first 100 and second 101 ends of the lever. It is desirable that the electromagnetic clutch assembly 1 be capable of modulating the clamping of the friction clutch plates in the primary clutch pack 90 in response to the electrical input to the solenoid coil 65. In other words it is desirable that the solenoid energy be either proportional to or substantially similar to the compressive energy to which the clutch pack 90 is subjected.

During operation the current flowing to the solenoid coil 65 is controlled by an electronic controller or other means known to one skilled in the art. Thus the current flowing through the solenoid coil 65 controls not only the generation of the magnetic field flux that attracts the armature plate 80, but also the resulting movement of the actuating hub 83 and the force transmitted through the cam lever assembly 85 to the clutch pack 90.

The following specific example is given to illustrate the invention and should not be construed to limit the scope of the invention.

An electromagnetic clutch assembly 1 was constructed in accordance with one embodiment of the present invention. The physical characteristics associated with the frictional clutch pack 90 incorporated into this clutch assembly 1 corresponded to nine small and large interleaved plates.

Figure 2:
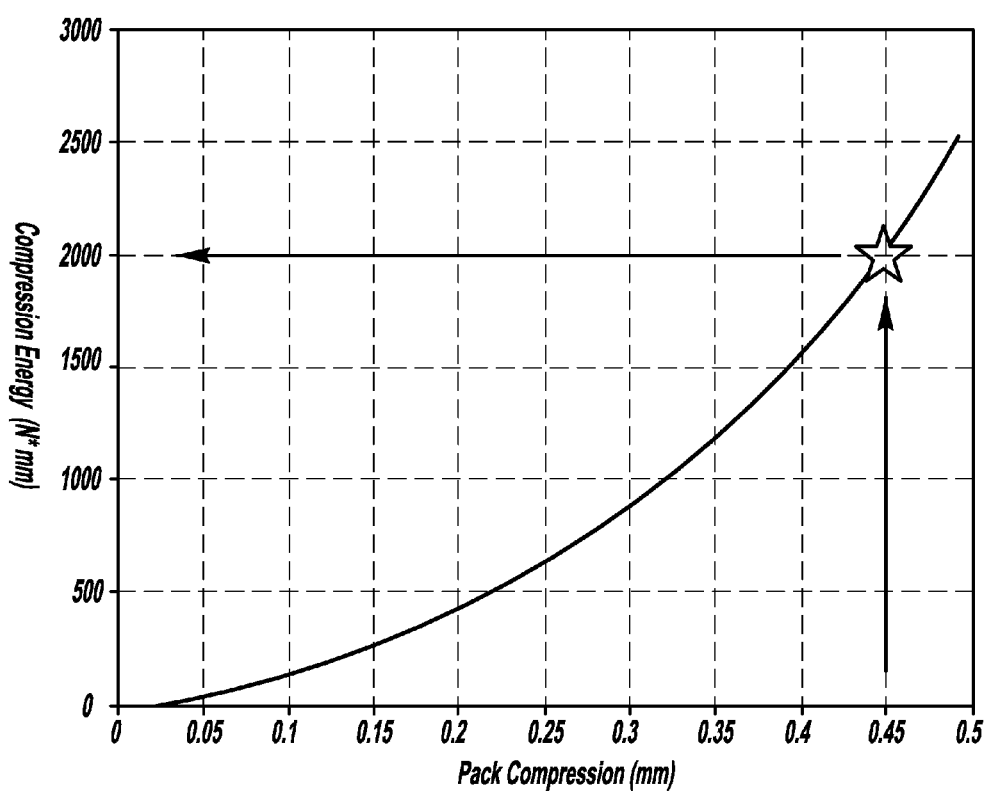
FIG. 2 is a graphical representation of the compression energy generated in an electromagnetic clutch assembly constructed according to one embodiment of the present invention plotted as a function of the resulting clutch pack compression.

The magnitude of electrical current supplied to the solenoid coil 65 of the clutch assembly 1 was varied and the resulting energy generated and the compressive forces created along with the magnitude of compression within the clutch pack 90 were measured. In FIG. 2, the overall compression energy generated by the application of electrical current to the solenoid coil 65 is plotted as a function of the resulting magnitude of the compression that occurred within the clutch pack 90. The non-linear relationship established shows a proportional relationship between the compression energy and the magnitude of the pack compression. As the amount of energy generated increases, the degree to which the clutch pack is compressed also increases. The compression energy is transmitted to the clutch pack 90 as a force transmitted through the actuating hub 83 and cam lever assembly 85.

Figure 3:
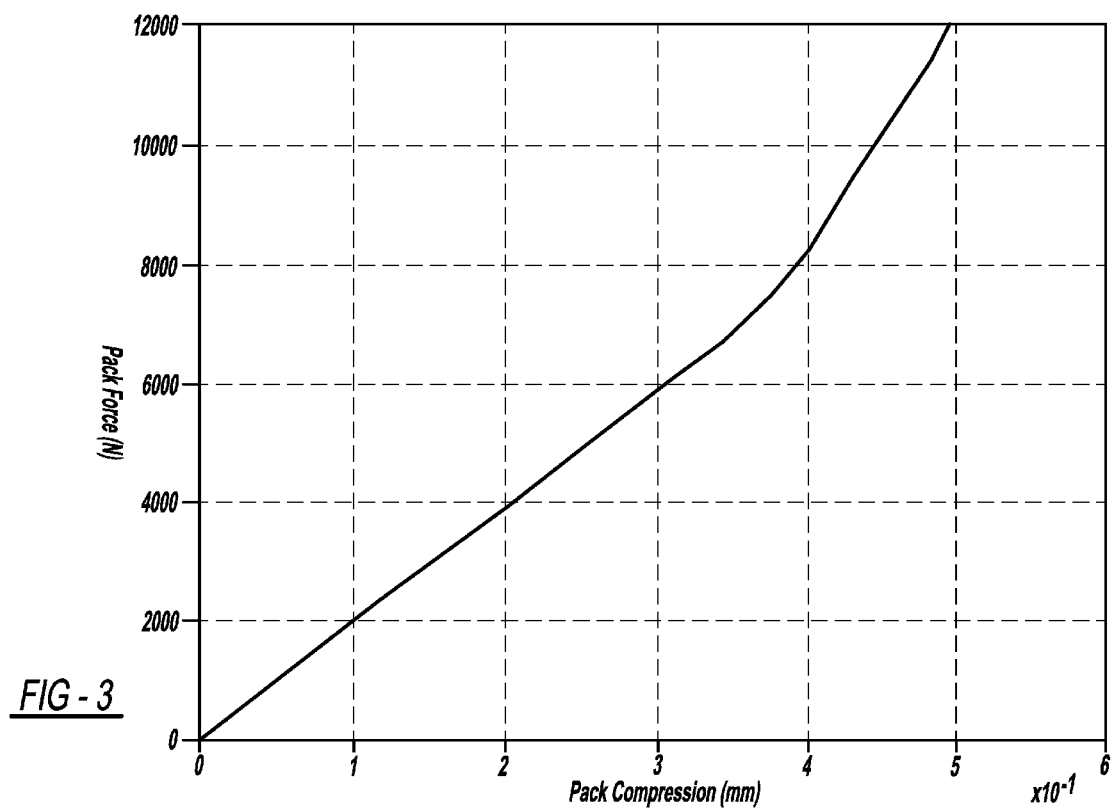
FIG. 3 is a graphical representation of the packing force transmitted to the clutch pack in an electromagnetic clutch assembly constructed according to one embodiment of the present invention plotted as a function of the resulting clutch pack compression.

Referring now to FIG. 3, the magnitude of the force transmitted through the cam lever assembly 85 to the clutch pack 90 is plotted as a function of the resulting magnitude of the compression that occurred within the clutch pack 90. The relationship between the applied force and the pack compression is substantially linear in nature as demonstrated by the constant slope of the line generated by the plotted data.

Figure 4:
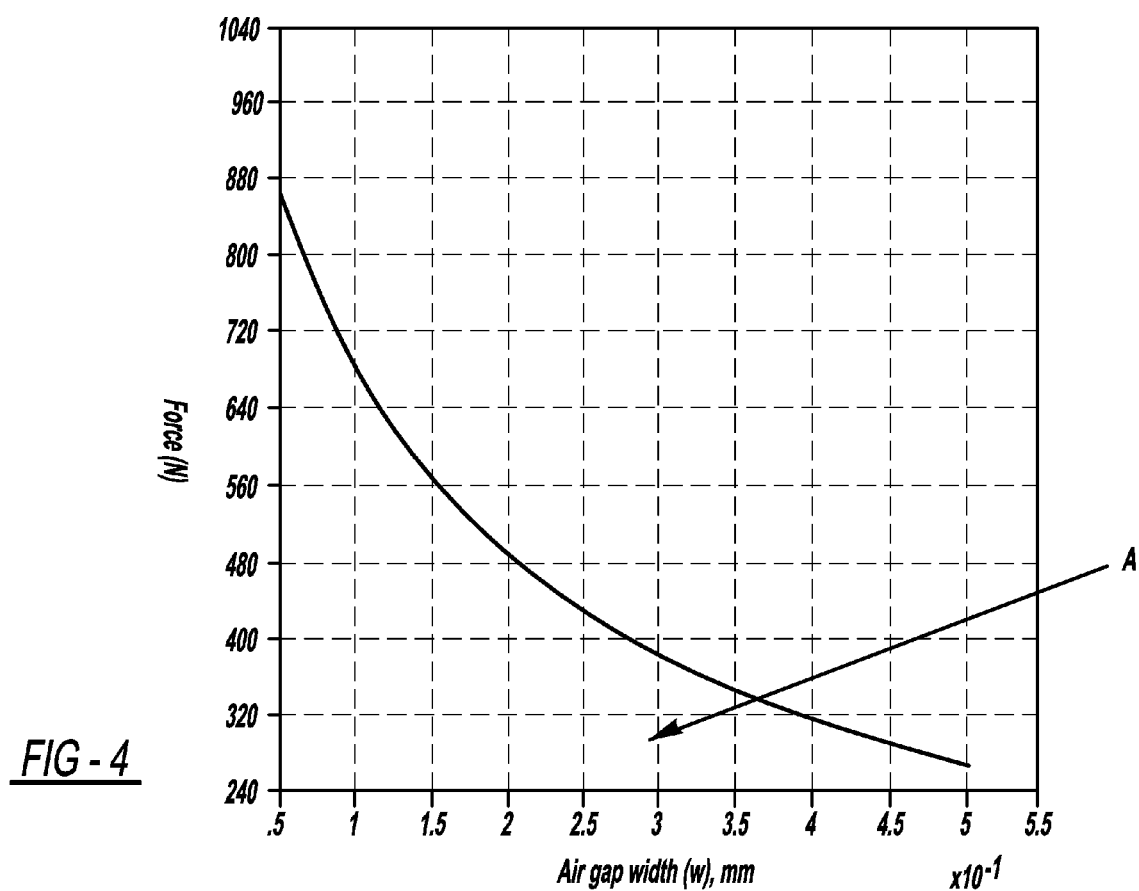
FIG. 4 is a graphical representation of the packing force generated plotted as a function of the decrease in the width of the air gap that occurs between the flux concentrating housing and the armature plate when an electromagnetic clutch assembly constructed according to one embodiment of the present invention is operated.

The applied force can be correlated back to the reduction in the width of the air gap 75 that occurs when the magnetic flux generated by the electrical current flowing through the solenoid coil 65 and flux concentrating annular housing 60 attracts the armature plate 80. In FIG. 4, the magnitude of the force generated that can be transmitted through the actuating hub 83 and cam lever assembly 85 to the clutch pack 90 is plotted as a function of the width of the air gap 75 between the flux concentrating housing 60 and armature plate 80. The non-linear relationship shown by the data demonstrates that the generated force increases as the width of the air gap decreases.

The overall magnitude of the compression energy that will be transmitted can be determined by calculating the area (A) under the force-gap curve (see FIG. 4) over the distance that the gap has decreased. For example, in FIG. 4 a decrease in the width (w) of the air gap from about 0.50 mm to about 0.05 mm results in a compression energy of about 2,042 N-mm (area under the curve). According to this one embodiment of the present invention the change in the width (w) of the air gap represents a reduction of about 90%. Referring once again to FIG. 2, a packing compression of about 0.45 mm is shown to correspond to the compression energy of about 2,042 N-mm as described above.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A clutch assembly for use in a vehicle comprising:
   an input member;
   an output member;
   a friction clutch pack having a first plurality of clutch plates coupled for rotation with said input member and a second plurality of clutch plates interleaved with said first plurality of clutch plates and coupled for rotation with said output member, the friction clutch pack enabling coupling of torque applied to said input member to be transmitted to said output member;
   a solenoid coil;
   an actuator hub having an armature plate; and
   a cam lever assembly having a first end engaging said actuator hub, a second end engaging the friction clutch pack and a pivot point located between the first end and the second end such that the effective distance ($D_1$) between the first end and the pivot point is greater than the effective distance ($D_2$) between the second end and the pivot point;
   wherein when electrical current is applied to said solenoid coil, the armature plate moves the actuator hub, the actuator hub engages the cam lever and causes said cam lever to compress the interleaved first and second plurality of clutch plates, thereby, resulting in the coupling of the input and output members.

2. The clutch assembly of claim 1, further comprising a bell-shaped housing that engages a flux concentrating annular housing with said annular housing providing protection for the solenoid coil.

3. The clutch assembly of claim 2, wherein the bell-shaped housing, the flux concentrating annular housing, and the solenoid coil are stationary.

4. The clutch assembly of claim 2, wherein the flux concentrating annular housing and solenoid coil are separated from the armature plate by an air gap.

5. The clutch assembly of claim 4, wherein when electrical current is applied to said solenoid coil, the generated magnetic flux causes the armature plate to be attracted by and move towards the flux concentrating housing and the solenoid coil, thereby decreasing the width (w) of the air gap.

6. The clutch assembly of claim 5, wherein the application of electrical current to the solenoid coil generates a compression energy.

7. The clutch assembly of claim 6, wherein the compression energy is transmitted to the clutch pack as an input packing force ($F_{in}$) transmitted through the actuating hub and cam lever assembly.

8. The clutch assembly of claim 6, wherein the compression energy transmitted to the clutch pack as an output packing force ($F_{out}$) is in a substantially linear relationship with the degree to which the interleaved clutch plates in the friction clutch pack are compressed.

9. The clutch assembly of claim 8, wherein the output packing force, $F_{out}$, is greater than the input packing force, $F_{in}$.

10. The clutch assembly of claim 1, wherein the input member further comprises an input shaft and engages a flange that is coupled to either a universal joint or a secondary shaft in the vehicle.

11. The clutch assembly of claim 1, wherein the input member and output member rotate independently from one another when electrical current is not applied to the solenoid coil.

12. The clutch assembly of claim 1, wherein the armature plate is secured in place by a snap ring positioned in a groove integrally formed with the actuator hub.

13. The clutch assembly of claim 1, wherein one of the input member or output member is stationary when electrical current is applied to the solenoid coil and the cam lever engages the clutch plates in the friction clutch pack.

14. The clutch assembly of claim 1, wherein the clutch assembly is not self-engaging.

15. The clutch assembly of claim 1, further comprising a mechanical stop to limit the motion of the cam lever assembly.

16. A clutch assembly for use in a vehicle comprising:
    an input member;
    an output member;
    a friction clutch pack having a first plurality of clutch plates coupled for rotation with said input member and a second plurality of clutch plates interleaved with said first plurality of clutch plates and coupled for rotation with said output member, the friction clutch pack enabling coupling of torque applied to said input member to be transmitted to said output member;
    a solenoid coil;
    an actuator hub having an armature plate; and
    a cam lever assembly having a first end engaging said actuator hub and a second end engaging the friction clutch pack;
    wherein when electrical current is applied to said solenoid coil, the armature plate moves the actuator hub, the actuator hub engages the cam lever and causes said cam lever to compress the interleaved first and second plurality of clutch plates, thereby, resulting in the coupling of the input and output members;
    wherein the application of electrical current to the solenoid coil generates a compression energy and the compression energy is transmitted to the clutch pack as an input packing force ($F_{in}$) transmitted through the actuating hub and cam lever assembly; the compression energy transmitted to the clutch pack as an output packing force ($F_{out}$) and the direction of the output packing force, $F_{out}$, is opposite that of the input packing force, $F_{in}$.

17. An electromagnetically activated clutch assembly the clutch assembly comprising,
    a rotatable input member;
    a rotatable output member;
    an actuator hub positioned proximate to the input member;
    a solenoid coil;
    a flux concentrating annular housing positioned proximate to the solenoid coil;
    an armature plate coupled to the actuator hub and separated from the flux concentrating annular housing and solenoid coil by an air gap;

a cam lever assembly having a first end engaging said actuator hub and a second end engaging a friction clutch pack; and the friction clutch pack having a first plurality of clutch plates coupled for rotation with said input member and a second plurality of clutch plates interleaved with said first plurality of clutch plates and coupled for rotation with said output member;

wherein when electrical current is applied to the solenoid coil, the magnetic flux so generated attracts the armature plate towards the flux concentrating housing and solenoid coil, thereby reducing the width (w) of the air gap and generating a compression energy;

wherein the width of the air gap decreases upon the application of electrical current to the solenoid coil;

wherein the cam lever assembly further comprises a pivot point located between the first end and the second end such that the effective distance (D1) between the first end and the pivot point is greater than the effective distance (D2) between the second end and the pivot point.

18. The clutch assembly of claim 17, wherein the compression energy is transmitted as a packing force through the actuator hub and the first and second ends of the cam lever assembly to the friction clutch pack.

19. The clutch assembly of claim 18, wherein the transfer of said packing force to the friction clutch pack causes the plates within the clutch pack to compress, thereby, coupling the input member to the output member.

20. The clutch assembly of claim 18, wherein the packing force is in a substantially linear relationship to the resulting compression of the clutch pack.

21. The clutch assembly of claim 17, wherein the width of the air gap when the electrical current is not applied to the solenoid coil is about 5.0 mm.

22. The clutch assembly of claim 17, wherein the width of the air gap when electrical current is applied to the solenoid coil is about 0.5 mm.

23. The clutch assembly of claim 17, wherein the width of the air gap decreases by about 90% upon the application of electrical current to the solenoid coil.

24. The clutch assembly of claim 17, wherein one of the input member or output member is stationary when electrical current is applied to the solenoid coil and the cam lever assembly engages the friction clutch pack.

* * * * *